No. 11,735. Reissued Apr. 18, 1899.

W. D. MARSHALL.

BARREL HOOP.

(Application filed Jan. 5, 1899.)

Witnesses

F. E. Alden.

H. J. Brunhoff

William D. Marshall Inventor.

By his Attorneys,

C. A. Snow & Co.

THE NORRIS PETERS CO., PHOTO-LITHO., WASHINGTON, D. C.

UNITED STATES PATENT OFFICE.

WILLIAM D. MARSHALL, OF FRANKLIN SQUARE, OHIO.

BARREL-HOOP.

SPECIFICATION forming part of Reissued Letters Patent No. 11,735, dated April 18, 1899.

Original No. 601,079, dated March 22, 1898. Application for reissue filed January 5, 1899. Serial No. 701,301.

*To all whom it may concern:*

Be it known that I, WILLIAM D. MARSHALL, of Franklin Square, in the county of Columbiana and State of Ohio, have invented certain new and useful Improvements in Barrel-Hoops; and I do hereby declare the following to be a full, clear, and exact description of the invention, such as will enable others skilled in the art to which it appertains to make and use the same.

My invention relates to hoops for securing the staves of barrels, tubs, and analogous receptacles together, and has for its object the production of a hoop consisting of one or more strands of wire and simple and effective means for securing the ends of the wire to retain the strands in position.

With these and other objects in view the invention consists in the novel constructions and combinations of parts hereinafter more fully described, and specifically set forth in the appended claims.

Figure 1:
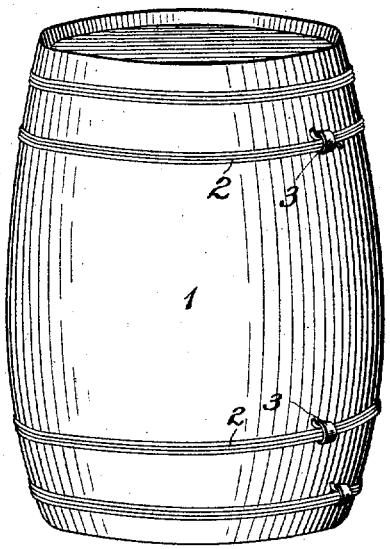
Figure 2:
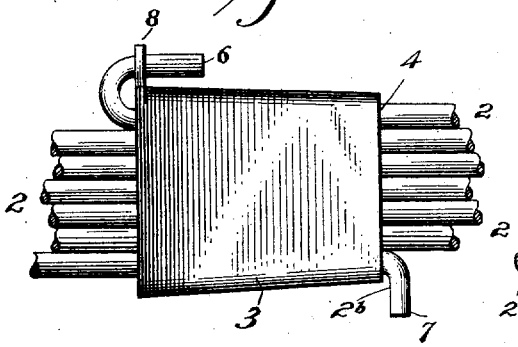
Figure 3:
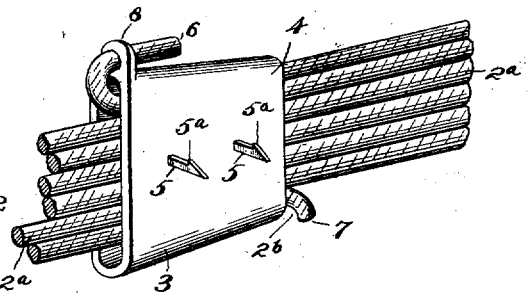

In the accompanying drawings, illustrating the invention, Figure 1 is a perspective view of a barrel, showing my improved hoop applied thereto. Fig. 2 is an enlarged detail view of a portion of the hoop, showing the retaining pin or sleeve and the manner of securing the ends of the wire strands; and Fig. 3 is a rear perspective view of the sleeve.

My invention has been devised for the purpose of substituting in lieu of the metal band-hoops commonly employed a hoop consisting of one or more strands of wire adapted to be tightly bound around the staves and the ends of the wire fitted and retained within a retaining sleeve or band in such manner as to prevent their parting and the hoop from becoming loose and dropping off. The provision of my device also insures the desirable feature of means whereby the band may be quickly and efficiently tightened to compensate for the contraction of the staves, which renders it of great advantage when it is desired to immediately employ the cask or barrel and to prevent the loss of time necessary to expand the staves by soaking or otherwise and also in the event of the staves of the filled barrel or cask becoming loosened, in which event the cask could not be soaked without liability of the contents thereof being completely destroyed or injured.

Referring to the drawings, the numeral 1 designates a barrel to which my improved hoop is shown applied.

In accordance with my invention I employ one or more parallel strands of wire 2 of the requisite strength and size and having one side thereof roughened or corrugated, as at $2^a$. These strands extend through and are maintained in position by a metal retaining band or sleeve 3, which is preferably made flaring, as shown, so that the contracted end 4 thereof will maintain the strands of wire in close relation and bind with frictional contact thereon. This retaining sleeve or band is provided on its under or inner side with one or more spurs or penetrating points 5, which are forced into the barrel-stave so as to retain the band in position thereon, said penetrating points being provided with the shoulders $5^a$ to prevent the same from working out or becoming loosened.

The wire hoop is made complete before its application to a barrel, and it consists of the requisite number of wire strands having the ends 6 7 cut off close to the ends of the sleeve or band, said ends being bent at right angles to form the shoulders $2^b$, which abut against the ends of the sleeve or band and prevent the wire from slipping out and the hoop becoming disconnected. I may, if desired, provide the band or sleeve with angularly-arranged retaining-hooks 8 and 9 to receive and confine the ends of the wire.

The hoop of my invention may be applied to a barrel or cask in the usual manner—that is to say, by placing the hoop over the end of the cask and forcing it into place thereon. During the operation of forcing home the hoop it binds upon the staves and draws them firmly together.

The peculiar form of the retaining band or sleeve and the provision of the spurs or penetrating points insures that the band will be firmly retained in position on the barrel. To further insure the confining of the band, I may provide each hoop with a plurality of bands or sleeves arranged at different points around the circumference of the barrel, and this I contemplate doing on barrels, casks, and other receptacles of large size or which are to endure great strain.

My invention provides a simple and efficient construction of band, which is manufactured at small cost and may be applied or removed with facility.

I desire it understood that I do not limit myself to the special constructions and arrangements of parts herein shown and described, but reserve to myself the right to make such changes as fairly fall within the spirit and scope of my invention.

Having thus described my invention, what I claim as new, and desire to secure by Letters Patent, is—

1. A metallic hoop bent or coiled from a single strand of wire forming a series of members laid in parallel relation one to the other, and a retaining sleeve or band which closely embraces said coiled strand between the respective ends thereof, said ends of the strand having interlocking engagement with opposite ends of the sleeve and restrained thereby against endwise displacement within the sleeve, for the purpose described, substantially as set forth.

2. A metallic hoop consisting of a series of strands or members laid in parallel relation one to the other, a retaining sleeve or band which embraces said members or strands and confines them firmly in place in relation one to the other, and means on the under face of the sleeve or band to hold the latter and the hoop from slipping on a package or barrel to which the hoop may be applied, substantially as described.

In testimony that I claim the foregoing as my own I have hereto affixed my signature in the presence of two witnesses.

WM. D. MARSHALL.

Witnesses:

C. E. GREENAMYER,

J. B. GREENAMYER.